United States Patent [19]
Willen

[11] 3,742,792
[45] July 3, 1973

[54] MULTIPLE-TOOL TOOL HOLDER
[75] Inventor: Charles Willen, Villeneuve, Switzerland
[73] Assignee: Charles Willen & Cie, Villeneuve, Switzerland
[22] Filed: July 14, 1971
[21] Appl. No.: 162,492

[30] Foreign Application Priority Data
Sept. 4, 1970   Switzerland...................... 13281/70

[52] U.S. Cl...................... 82/36 R, 29/57, 408/239
[51] Int. Cl............................................. B23b 29/26
[58] Field of Search...................... 82/36, 36 A, 35, 82/37, 25; 29/57; 408/239

[56] References Cited
UNITED STATES PATENTS
3,471,912  10/1969  Johnson.................................. 29/57
3,109,336  11/1963  Rozum.................................. 82/36 A
3,181,400  5/1965  Kohring.................................. 82/25

Primary Examiner—Leonidas Vlachos
Attorney—Robert E. Burns et al.

[57] ABSTRACT

This tool holder notably for turret lathes is of the multiple block type and permits modification of the geometry of the tool holder body according to the number of chisels or other tools required for a given machining operation. It comprises a carrier block having a integral shank for securing same to the turret and at least one additional block detachably secured to said carrier block.

7 Claims, 4 Drawing Figures

MULTIPLE-TOOL TOOL HOLDER

The present invention is concerned with tool holders and has specific reference to a multiple-combination or multiple-tool tool holder suitable for use on automatic or semi-automatic lathes.

The term tool holder body employed in the following disclosure refers to a member adapted to be fastened directly to the turret of a turret-lathe. Cold-chisels or even cutting tools are adapted to be mounted on the tool holder body.

The tool holder according to this invention is of the multiple-block type and can be assembled in a manner permitting the adapting of the geometrical configuration of the tool holder body to the number of cold-chisels or other tools necessary for performing a given work.

This multiple-combination tool holder body is characterized in that it comprises a carrier block formed with an integral shank permitting of fastening same to a lathe, and at least one additional block detachably secured to the carrier block.

Reference will now be made to the attached drawings illustrating diagrammatically by way of example two typical forms of embodiment of the invention. In the drawings.

Figure 2:
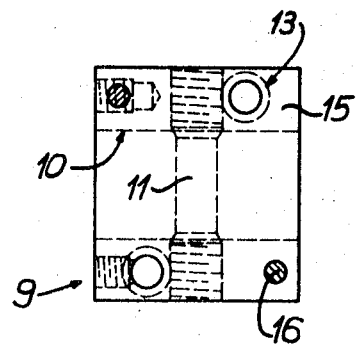
FIG. 2 is a front view of the face of carrier block to which an additional block can be secured, the view being taken along the plane II—II of FIG. 1.
Figure 3:
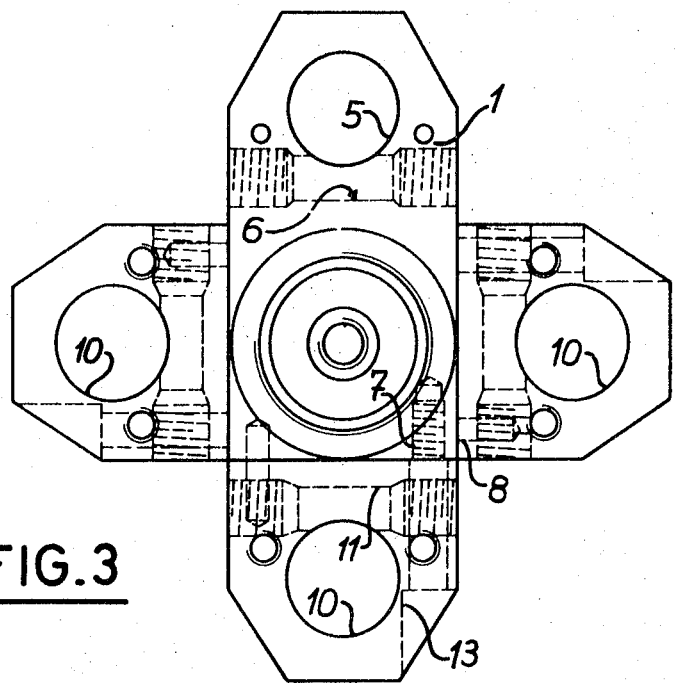
FIG. 3 is a front view of a carrier block to which three additional blocks are secured.

The tool holder body comprises a main or carrier block 1 (FIGS. 1, 2 and 3) provided with an integral shank 2 for securing same to the turret of a lathe.

This carrier block comprises a tapered cavity or recess 3 coaxial with the shank 2 and adapted to receive a clamp for securing a central tool. This carrier block further comprises on its outer periphery a bore 5 having its axis parallel to the shank and cavity and the bore 5 is adapted to receive the shank of a cold-chisel carrier. This shank (not shown) is locked in position by means of a tangential lock rod engaging a bore 6 perpendicular to the bore 5. This lock rod may be pushed and retained in the locking position by means of a grub screw, or alternately pulled by a nut engaging a screw-threaded portion of the rod.

Finally, this carrier block comprises a set of six tapped bores 7 and a set of six pin-receiving holes 8 opening by pairs into the three flat faces of the block which are parallel to the axis of bore 6. These bores and holes are so disposed as to avoid any interference therebetween.

An additional block such as 9 can be secured to each one of the flat faces. Each additional block 9 is of parallelipipedic configuration with two edges (symmetrical in relation to one of the median planes of the block) bevelled as shown notably in FIG. 3.

The additional block 9 comprises a bore 10 for securing the shank of a chisel holder. This shank is locked in position by a tangential lock rod engaging the bore 11 perpendicular to bore 10. As in the case of the carrier block 1 this lock rod may be either pulled by means of a nut engaging a screw-threaded portion of the rod, or pushed and retained in position by a socketed-head or grub screw.

This additional block comprises a pair of complementary parallel through bores 12 for receiving fastening screws. The heads of these fastening screws are adapted to be received in countersunk recesses 13 formed in each one of the bevelled portions 14 of these additional blocks.

These parallel bores 12 open on a flat face 15 of the additional block, and this face is parallel to the axis of bore 10.

Figure 1:
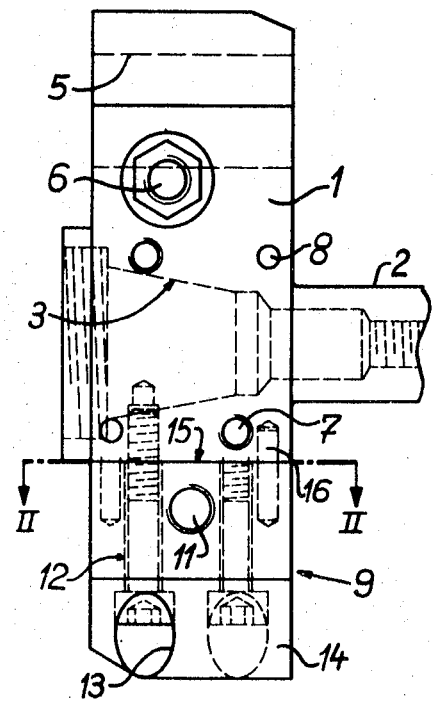
FIG. 1 is a side elevational view showing a carrier block to which an additional block is detachably mounted.

A pair of positioning pins 16 project from this face (FIG. 1).

The relative position of these pins and bores is so calculated that the fastening screws and positioning pins can co-operate with the tapped bores 7 and pin-receiving holes 8, respectively, which are formed in one of the faces of the carrier block when the two blocks are assembled. With this arrangement each additional block 9 can be positioned and secured very easily and rapidly with respect to the carrier block 1. It is clear that one, two or three additional blocks such as 9 can be secured to the carrier block 1 according to the number of chisel-carriers required for the specific machining work to be performed.

This multiple-block tool holder body is characterized by a high degree of rigidity and minimum overall dimensions. It is particularly advantageous for use on eight-hole turret lathes.

Figure 4:
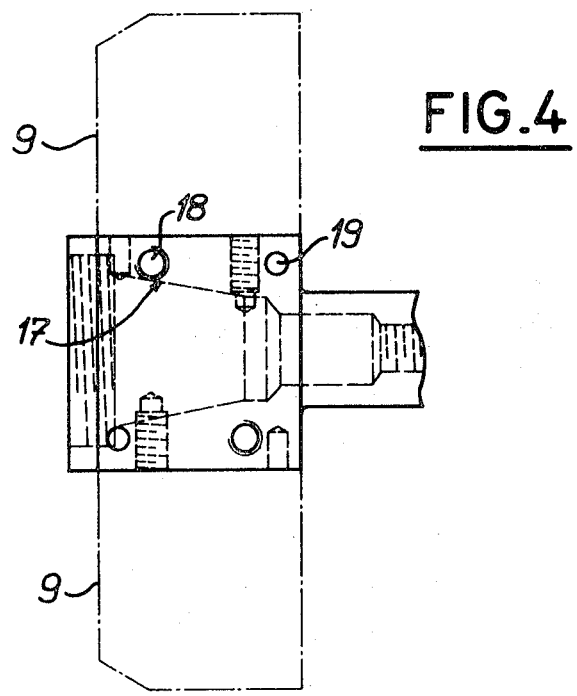
FIG. 4 is a side elevational view showing a modified form of embodiment of the carrier block, the dash and dot lines showing the possible positions of two additional blocks.

According to a modified form of embodiment illustrated in FIG. 4 the carrier block comprises only one tapered recess 17 for securing a central tool. In this case it comprises four flat faces parallel to the axis of this recess, eight tapped bores 18 and eight holes 19 for receiving positioning pins, these bores and holes opening by pairs into these four faces. The maximum number of additional blocks that can be secured to this carrier block is thus four, instead of three in the preceding form of embodiment.

The tool holder body according to this modified form of embodiment is characterized by the same advantageous features as the preceding one, with similar results.

By reason of the interchangeability of its component elements, the tool holder body according to this invention affords a more rational use of the turret lathes on which it is used, thus increasing the efficiency of these machine-tools.

Of course, it would not constitute a departure from the basic principles of this invention to impart to the contact faces of the carrier block and additional blocks a geometrical configuration other than that illustrated in the drawings, and/or to increase the number of additional blocks adaptable to the carrier block.

I claim:

1. A multiple-combination tool holder body for use with an automatic or semi-automatic turret lathe comprising: a carrier block having at least three flat faces, a shank integral with said carrier block for securing same to a lathe during use of the tool holder body, means defining a tapered recess within said carrier block coaxial with said shank for receiving therein a central tool, and means in said carrier block defining a set of tapped bores and a set of holes disposed such that two tapped bores and two holes open at each of said flat faces; at least one additional block having means for carrying an additional tool and having a flat face positionable into abutting engagement with one of said flat faces on said carrier block; and means coacting with said set of tapped bores and said set of holes for releasably attaching said additional block to said carrier block when same are in abutting engagement.

2. A tool holder body as set forth in claim 1; wherein said carrier block includes means therein defining a carrier bore whose axis extends parallel to the longitudinal axis of said tapered recess for receiving therein a tool carrier, and wherein said sets of tapped bores and holes comprise three pairs of tapped bores and three pairs of holes.

3. A tool holder body as set forth in claim 1; wherein said carrier block has four flat faces, and wherein said sets of tapped bores and holes comprise four pairs of tapped bores and four pairs of holes.

4. A tool holder body as set forth in claim 2, wherein said carrier block has means therein defining a bore having its axis perpendicular to said carrier bore for receiving a lock pin extending tangentially to the carrier bore tool shank.

5. A tool holder body as set forth in claim 1, wherein each additional block has means therein defining two bores perpendicular to each other and wherein one of said two bores is configured to receive the shank of a chisel carrier and the other of said two bores is configured to receive a tangential pin for locking said shank in position, said chisel shank-receiving bore having its axis parallel to said tapered recess in said carrier block when said blocks are attached together.

6. A tool holder body as set forth in claim 1, wherein said means for releasably attaching the block includes a pair of positioning pins on each additional block projecting from its flat face and insertable into one of said pair of holes in said carrier block.

7. A tool holder body as set forth in claim 6, wherein said means for releasably attaching the blocks further includes means defining a pair of parallel through bores in each additional block opening at its flat face and receiving therethrough fastening screws which coact with said tapped bores in said flat face of said carrier block.

* * * * *